Patented Nov. 1, 1932

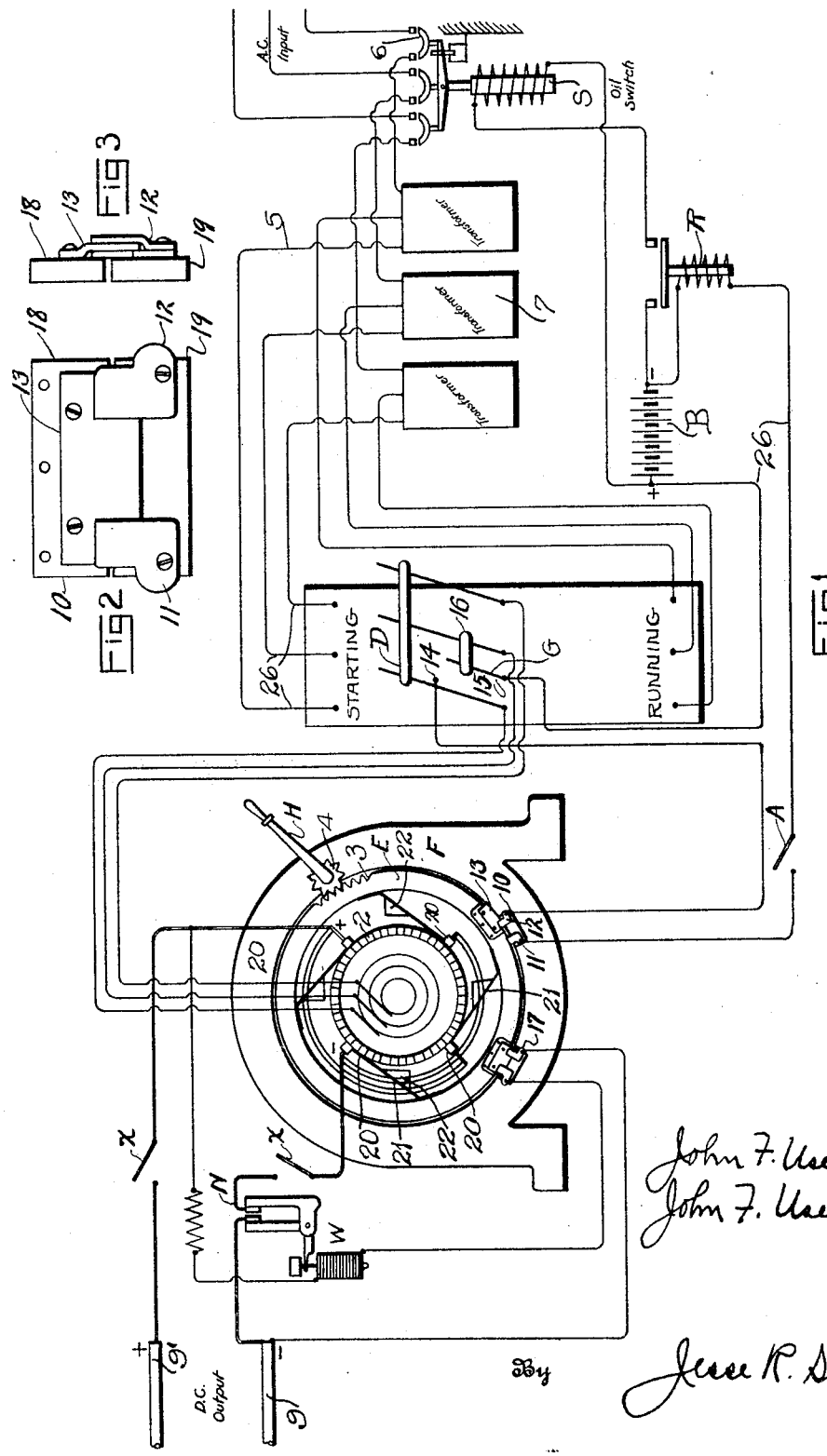

1,885,569

UNITED STATES PATENT OFFICE

JOHN F. USENER, SR., AND JOHN F. USENER, JR., OF HOUSTON, TEXAS

CONTROL CIRCUIT

Application filed August 17, 1928. Serial No. 300,189.

Our invention relates to a control system to prevent flashing at the brushes of a rotary converter, due to an attempt to start the converter with the brushes in the wrong position.

It is the object of this invention to positively control or protect the starting circuit of a rotary converter to prevent flashing at the commutator when starting.

Another object is to equip a converter of the type where the brushes are raised and lowered with a double protection device so that starting when the brushes are in contact with the commutator is impossible.

An additional object is to so equip the circuit that the double throw switch will be inoperative if moved from the starting to running position when the brushes are not properly set.

A further object is to provide a triple protection for the starting circuit.

Our improvement is adapted to be applied to that type of rotary converter wherein the D. C. brushes are raised away from the commutator during the starting operation and lowered to the commutator after it is running but before the full load is taken by the commutator. The starting is accomplished by means of two or more brushes which remain in contact with the commutator at all times and are generally termed pilot brushes. These brushes also indicate the direction of flow of the current in starting.

The addition of our devices to the usual system is simple, does not necessitate any radical changes in equipment and may be readily installed upon machines which are already in service.

The control system will be readily understood when considered with the description following and the drawing herewith, in which similar reference character represents similar structure thruout.

Fig. 1 is a diagrammatic layout of a rotary converter and its control circuit with our improvements attached in the circuit.

Fig. 2 is an enlarged elevation of the type of sliding switch used on the converter and:

Fig. 3 is a section taken thru Fig. 2.

The present apparatus is to be installed on rotary converters to prevent damage to such equipment where improper procedure is followed in starting.

In ordinary practice a low starting voltage is impressed on rotary converters of large or comparatively large capacities, when starting. After such converters are brought up to operating speed, a change from a low starting voltage is made to a higher voltage before any outside load is placed upon such equipment. We intend to provide devices to protect the equipment in event of three specific sets of circumstances.

Provision No. 1. In the case of rotary converters it is absolutely essential that there be no load other than the inertia of the machine, when such machine is being started. Also, to prevent serious damage and consequent interruptions to service, the brushes delivering the D. C. power from the machine, must be raised or lifted so that such brushes are not in contact with commutator. This is one necessary provision in starting rotary converters, and in this explanation shall be known as provision number one.

Fig. 1 of the drawing shows the general layout of the system and has been illustrated in connection with our improvement so that a complete understanding of the invention may be obtained. The converter itself is shown by a sectional view thru the D. C. side of the commutator 2 and shows the frame F, the rotatable yoke or ring E and the handle H whereby the yoke is rotated. The brushes are designated by the numeral 20 and are carried by the supporting yoke by means of the arms 21 but are adapted to be raised away from the commutator 2 by any well known means such as the camming action of the members 22 which are carried by the frame F which is usual construction in this type of converter. When the yoke E is rotated by means of the rack 3 and pinion 4 and the handle H, the brushes are raised away from or lowered in contact with the commutator when the arms 21 engage the members 22. The section shown is taken with the brushes in lowered position. The handle H is raised from its illustrated position to raise the brushes.

This converter is the usual three phase type with the A. C. input shown as applied to circuit 5 at the right hand side passing thru the solenoid operated oil switch 6, transformers 7, and the three pole double throw combination running and starting switch D designated generally by the letter D. The circuit is completed thru this pole switch, the converter, and the output is thru the high voltage D. C. bus bars, the negative bus and the positive bus being shown at 9 and 9′.

The circuit is usually protected by a D. C. circuit breaker as shown at N controlled by a solenoid W, current for which is taken from the negative D. C. bus 9 or it may be grounded on the frame F of the converter. The letters X and X′ have been applied to two similar switches in the main leads from the machine to the negative and positive D. C. busses respectively.

The usual A. C. relay operated circuit breaker is shown at R and in this instance is shown as operated by a storage battery B and located in the starting circuit 26. This starting circuit is termed as the "pull-in" circuit. This pull-in circuit is completed by the pull-in switch or starting switch A. In schematic diagram Fig. 1, is shown the essential equipment and conventional installation of a rotary converter for converting alternating current to direct or continuous current that is non-automatic in operation, but with remote control of the oil circuit breaker on hi-voltage A. C. or input side. The closing of the oil circuit breaker is brought about by magnetic action through the energizing of a solenoid of sufficient power to operate the moving parts of the oil circuit breaker. This solenoid is energized ordinarily by storage batteries such as B or other source of direct or continuous current. In conventional installations the application of direct current to the oil circuit breaker operating solenoid is accomplished by closing the circuit on an auxiliary relay connected in the solenoid operating circuit. This relay is operated by a separate circuit which is closed by a small manually operated switch. When the cycle of operation brought about by closing this relay circuit is completed the circuit actuating relay is automatically opened by releasing the hand operated switch which closed the circuit (the switch being opened by a spring). When the oil circuit breaker is closed by its solenoid operating mechanism it is automatically locked in a closed position by a mechanically operated device in the oil circuit breaker. The switch being held closed by this locking device, the operating solenoid having completed its function, its energizing current is cut off by having the circuit opened through an auxiliary switch S in that circuit which is operated by the mechanism closing the main switch or oil circuit breaker. Thus, since it is no longer required, there is no flow of current through relay or switch operating solenoid. The opening of the oil circuit breaker automatically closes the interlocking switch S in the solenoid circuit, and the mechanism is ready to again perform its cycle of operation in closing the oil circuit breaker.

Thus, in the ordinary circuit before our improvement is applied, it was necessary to place the pole switch D in the upper or starting position, move the handle H to the upward position to raise the D. C. brushes from the commutator; and lastly close the pull-in switch A. If these three steps were taken then the converter started. After it was in motion the brushes were lowered to the commutator by lowering the lever H and then the pole switch was moved from starting to the downward or lower position and the load thus placed upon the converter from the transformers and A. C. in-put.

As previously stated, it often happens that the attendant neglects to raise the brushes away from the commutator before placing the pole switch D in the upper or starting position and then closing the pull-in switch A. A flashover is almost certain to result and it is one of my improvements to place a cut-out or sliding switch in this starting circuit. Such a switch is shown at 10 having the two contacts 11 and 12 attached on the frame F of the converter and the blade 13 thereof fastened to the rotatable yoke E. Thus it will be apparent that the starting circuit is interrupted by this sliding switch when the brushes are down on the commutator, and it is impossible to start the converter until the brushes have been raised and the sliding switch 10 thus closed by the rotation of the yoke E which performs both operations simultaneously.

Provision No. 2. In starting large rotary converters, or motors, to prevent damage to the armature coils in such machines through excessive strains and stresses, by too great a flow of current through such windings, a low starting voltage is applied to such equipment, and such machines are brought up to operating speed before the high voltage power delivering current is applied. This is an essential procedure in starting such machines and shall be called provision No. 2.

To further protect the converter and prevent flashing, a second protective switch B is also placed in the starting circuit; this switch is of the knife type and is shown as applied to the center of the double throw pole switch D. This knife switch comprises a contact 14, blade 15, and the handle part 16. It is so connected into the starting circuit that it is closed only when the pole switch is in the starting position. Primarily this knife switch is to make it impossible to start the converter by closing the pull-in switch A even when the brushes are in the proper position and the switch 10 closed, unless the pole switch D is in the starting position. This prevents the attendant from starting the converter with the pole switch in the running or full load position and prevents starting of the converter on the high or running voltage. This knife switch is completely insulated from the pole switch. The oil switch 6 is preferably of the magnetic or latching type which will remain latched after it has once been closed so long as current is flowing through the line. Thus the closing of the knife switch G energizes the relay R and closes the oil switch which then latches. When the pole switch D is moved from starting to running position the oil switch will remain latched.

From the foregoing it will be obvious that a double check on the starting system has been provided to prevent starting with either the brushes in wrong position or the pole switch in wrong position.

Provision No. 3. In starting rotary converters, as has been stated before, no load other than the inertia of the machine, on such equipment is permissible. Such machines converting alternating current to continuous or direct current, must not be connected to load until after converter has been brought up to operating speed, the proper voltage applied at alternating current side, and the direct current brushes on the output side are lowered or otherwise brought into contact with the commutator on the output side. After this has been done the load can be connected to machine. This shall be known hereafter as provision number three.

As a third check or protection against flashovers, we have attached to the converter a second sliding switch 17 which is similar in construction and operation to the switch 10 previously described. This second switch is wired into the circuit of D. C. low voltage release circuit breaker N and makes the solenoid W thereof inoperative unless the brushes of the converter are in the lowered position to take the load from the commutator. If the circuit breaker N is open the load will not be connected to the converter and no flashover will result. This switch 17, it will be noted is so arranged that it is closed when the brushes are down or in running position so that the solenoid W will be energized and the circuit breaker N will remain closed and the output of the converter may flow to the D. C. busbar. The principal need of this switch is because of surges on the high voltage lines 9 and 9' from lighting and other causes. These surges open the D. C. circuit release N while the converter is carrying the load and the brushes are down. The attendant in his haste to close the circuit breaker places the pole switch D and brushes in the starting position and then attempts to close the circuit breaker. As shown when the brushes are in raised position this second switch is open and the circuit breaker will not stay closed to take the load and the attendant will readily see that he must wait until the converter is started before he can move the pole switch to the running position and place the brushes in running position in order to close the release circuit to connect the converter to whatever load is on the high lines 9 and 9'.

A detailed showing of a sliding switch is illustrated in Figs. 2 and 3 and comprises the blade 13, contacts 11 and 12 and the insulating fibre blocks 18 and 19 which are attached to the yoke E and the frame F of converter respectively.

The knife switch G attached to the pole switch D comprises a contact 14 arranged in the board and a short knife blade 15 attached by means of a handle member 16 to the central blade of the pole switch. This form is shown but it is understood that any of the switches shown may take various forms without departing from the spirit of our invention.

The circuits and control arrangements here shown are to protect the converter where the load is on the D. C. side and a reverse switch is employed to throw the circuit breaker if the current is reversed. However it seems obvious that the arrangement may be duplicated and so assembled that protection may be had for a load upon the A. C. side.

It will be seen from the foregoing that we have provided a double check protective control for the starting circuit and a single check on the low voltage release circuit. Accordingly with these three protective means in the system it is impossible to burn the brushes and commutator by a flashover from voltage surges or from inexperience or inadvertence on the part of the attendant.

Having described our improvement, what we desire to protect by Letters Patent is:

1. The combination of a rotary converter having a commutator and commutator brushes, means for raising and lowering the brushes comprising a rotatable ring, brush arms pivoted thereto, means for causing the brushes to lift when the ring is rotated in one direction and lowering the brushes to contact the commutator when the ring is rotated in the other direction, load conductors connected to the brushes, a contactor in one of the load conductors, electromagnetic means for closing said contactor, a circuit for energizing said electromagnetic means, contacts in said circuit, means on the ring and stator for closing the contacts when the ring is moved to lower the brushes, whereby the contactor is closed and the load circuit can only be connected to the converter brushes when the brushes are in their commutator contacting position.

2. The combination of a rotary converter having a commutator and commutator brushes, means for raising and lowering said brushes comprising a rotatable ring, means for causing the brushes to lift away from the commutator upon rotation of said ring in one direction to avoid overloading said brushes when in the lowered position, and means operable upon movement of said ring in said one direction to disconnect the D. C. output circuit to the converter.

3. A control circuit comprising in combination a rotary converter, brushes on said converter, means adjacent said brushes to raise and lower the same, and means attached to said first means to cut out the starting circuit when the said brushes are in lowered position, a pole switch, a knife switch connected to said pole switch, an electric starting circuit connected to one side of both of said switches which circuit is opened by said knife switch unless said pole switch is in starting position to close said knife switch.

4. A control circuit for rotary converters having movable brushes, comprising a converter starting circuit, a low voltage release circuit, a control switch in the said low voltage release circuit, a control switch in said starting circuit, both of said switches being operable upon movement of the converter brushes to cut in or cut out said circuits, and a second switch in said starting circuit adapted to be closed in either starting or running position.

5. In combination with a rotary converter having a rotatable ring to raise and lower the D. C. brushes, a low voltage starting circuit, a high voltage running circuit, and a high voltage load circuit all connected to said converter, interlocking switches operable by movement of said ring, one of said switches being connected in said running circuit whereby said converter may only be started when the D. C. brushes are in raised position, and another of said switches being connected in said load circuit whereby the D. C. side of said converter can only be closed when the brushes are in lowered position.

In testimony whereof we hereunto affix our signatures this 10th day of Aug., A. D. 1928.

JOHN F. USENER, Sr.
JOHN F. USENER, Jr.